United States Patent
Loghmani

(10) Patent No.: US 6,948,129 B1
(45) Date of Patent: Sep. 20, 2005

(54) MULTI-MODAL, MULTI-PATH USER INTERFACE FOR SIMULTANEOUS ACCESS TO INTERNET DATA OVER MULTIPLE MEDIA

(76) Inventor: Masoud S Loghmani, 267 Long Point Rd., Crownsville, MD (US) 21032

( * ) Notice: Subject to any disclaimer, the term of this patent is extended or adjusted under 35 U.S.C. 154(b) by 460 days.

(21) Appl. No.: 10/067,985

(22) Filed: Feb. 8, 2002

Related U.S. Application Data

(60) Provisional application No. 60/267,206, filed on Feb. 8, 2001.

(51) Int. Cl.[7] ............................................. G06F 3/00
(52) U.S. Cl. ...................... 715/751; 715/727; 709/227
(58) Field of Search ................... 345/751, 752, 345/753, 727, 728, 733, 716, 734, 968, 1.1, 345/3.1, 759; 709/227, 228, 229, 201

(56) References Cited

U.S. PATENT DOCUMENTS

| | | | | |
|---|---|---|---|---|
| 5,291,583 A | | 3/1994 | Bapat ........................... 395/500 |
| 5,594,859 A | * | 1/1997 | Palmer et al. ............... 345/756 |
| 5,715,314 A | | 2/1998 | Payne et al. .................. 380/24 |
| 5,745,681 A | | 4/1998 | Levine et al. ................ 709/200 |
| 5,745,754 A | | 4/1998 | Lagarde et al. ............. 395/615 |
| 5,761,280 A | | 6/1998 | Noonen et al. ............... 379/93 |
| 5,799,278 A | | 8/1998 | Cobbett et al. .............. 704/232 |
| 5,802,526 A | | 9/1998 | Fawcett et al. .............. 707/104 |
| 5,806,030 A | | 9/1998 | Junqua ........................ 704/245 |
| 5,806,033 A | | 9/1998 | Lyberg ........................ 704/255 |
| 5,809,462 A | | 9/1998 | Nussbaum ................... 704/232 |
| 5,867,816 A | | 2/1999 | Nussbaum ................... 704/232 |
| 5,884,262 A | | 3/1999 | Wise et al. ............... 704/270.1 |
| 5,913,196 A | | 6/1999 | Talmor et al. ............... 704/270 |
| 5,915,001 A | | 6/1999 | Uppaluru .................. 379/88.22 |
| 5,953,392 A | | 9/1999 | Rhie et al. ................ 379/88.13 |
| 5,991,712 A | | 11/1999 | Martin ........................ 704/10 |
| 6,101,473 A | | 8/2000 | Scott et al. .................. 704/275 |
| 6,134,235 A | | 10/2000 | Goldman et al. ........... 370/352 |
| 6,167,376 A | | 12/2000 | Ditzik ......................... 704/231 |
| 6,201,859 B1 | * | 3/2001 | Memhard et al. ........ 379/93.21 |
| 6,215,784 B1 | | 4/2001 | Petras et al. ................. 370/356 |
| 6,240,448 B1 | | 5/2001 | Imielinski et al. ....... 379/90.01 |
| 6,269,336 B1 | | 7/2001 | Ladd et al. .................. 704/270 |
| 6,335,928 B1 | | 1/2002 | Herrmann et al. .......... 370/352 |
| 6,346,952 B1 | * | 2/2002 | Shtivelman ................. 345/758 |
| 6,377,927 B1 | | 4/2002 | Loghmani et al. .......... 704/275 |
| 6,560,456 B1 | | 5/2003 | Lohtia et al. ................ 455/445 |
| 6,604,129 B2 | * | 8/2003 | Slutsman et al. ........... 709/204 |
| 6,748,420 B1 | * | 6/2004 | Quatrano et al. ........... 709/205 |
| 6,751,453 B2 | | 6/2004 | Schemers et al. ........... 455/412 |
| 6,801,763 B2 | | 10/2004 | Elsey et al. .............. 455/404.1 |
| 2001/0033564 A1 | | 10/2001 | Hickman .................... 370/352 |

FOREIGN PATENT DOCUMENTS

GB      2 317 070      3/1998      ........... H04M 3/50

* cited by examiner

Primary Examiner—Raymond J. Bayerl
Assistant Examiner—Kieu D. Vu
(74) Attorney, Agent, or Firm—Roylance, Abrams, Berdo & Goodman, L.L.P.

(57) ABSTRACT

A method for simultaneous multi-path, multi-modal, and multi-user interface to users is discussed, where multiple inputs during the same user session arriving from different devices are handled properly. Each input is assigned a unique identifier, clocked with a counter and associated with an address. Other inputs that attempt to arrive at the same location are discarded.

20 Claims, 2 Drawing Sheets

MULTI-MODAL, MULTI-PATH USER INTERFACE FOR SIMULTANEOUS ACCESS TO INTERNET DATA OVER MULTIPLE MEDIA

This application claims the benefit of U.S. provisional application Ser. No. 60/267,206, filed Feb. 8, 2001.

FIELD OF THE INVENTION

The present invention relates to a method and apparatus for providing simultaneous multi-path inputs in a system with multiple simultaneous input and output modes such as voice and display/keyboard, or system where many users may interact with the same sessions, such as a remote learning session where multiple students attend a given class. The present invention resolves the issue of two or more input values from multiple different devices or users attempting to occupy the same location.

BACKGROUND OF THE INVENTION

Various services now provide voice and non-voice access to Internet data. A caller may access a "Voice Portal" or "Voice Site" by simply dialing a number advertised by the company providing the Voice Access service. The caller will hear a greeting that requests the caller to "speak" or "enter" specific commands. As an example, a caller may ask the system to provide him/her with the latest weather information by simply speaking a command, or pressing a DTMF button on the phone. The information provided to the user may be pre-recorded and accessed from a database, or it may be accessed from a page similar to those available on the Internet. The mark-up language used to code the page may be VoiceXML or any other type of XML-based coding language. Some legacy systems may use proprietary or less commonly used methods for connecting the system to back-end data servers.

However, in all existing systems, users interact with data only through one interface, that is, either a voice interface (e.g., a telephone) or a data interface (e.g. an Internet browser). This single mode interaction causes limitations on delivery of services to users. As an example, a user who is driving a car may ask for address information between point A and point B by issuing voice commands, and hear back the directions read to him via a speaker in the car. However, the same navigation information would not be available in graphical format. Another example is a user who is using a data-enabled mobile phone to review his investment portfolio. The user may wish to see the data, but input the queries by simply speaking them into the phone. Current systems do not allow for such capability.

Another limitation of existing systems is that they do not allow more than one user to interact with an application in one session. The present invention makes this possible. One example of where this may be required is a cooperative form filling application where two users need to be logged onto the same session, and each answers specific questions as they are presented. The present invention makes it possible for the two attendants to call into the system, and interact with the same application through a single session, thereby filling one form by two users.

The problem that arises in multi-modal or multi-user interaction with a single session (as in the above examples) is that multiple input values may be received for the same query through different channels. A simple solution would be to accept the first chronologically arriving input value, and discard the subsequent ones. This solution, however, fails when there are many rounds of query-input in the same application. Consider the case of a query A followed by two inputs a-1 and a-2. Input a-1 is accepted, but before input a-2 arrives in the system, another query B is made. Now input a-2 arrives in the system followed by a valid input b-1. The system would accept false input a-2, and discard valid input b-1. FIG. 1 illustrates when "Accept First Input" fails in the case of multiple queries and inputs. Throughout the FIGS. 1, 2 and 3, the sunburst symbol 12 represents an accepted input, and the crossed-out symbol 14 represents an incorrectly accepted input or an incorrectly discarded input, for illustrative purposes.

The solution to this problem is to identify every input with the name of the query that it is attempting to address. In this case, the system would know that the second a-2 input is not intended for query B, would discard it, and would accept the valid input b-1.

However, this solution also falls short when the same dialog is repetitively used. For example if the system makes a query A for the first time (designated as A1). Two responses a1-1 and a1-2 are sent back. Response a-1 is accepted as valid, but before response a1-2 arrives, the system repeats the same dialog, repeating query A (designated as A2). User(s) reply with a response a2-1. However, false response a1-2 arrives first, is accepted as valid, and valid input a2-1 is discarded as invalid. FIG. 2 "Accept Tagged Input" fails when the same dialog is repeated.

SUMMARY OF THE INVENTION

The present invention resolves the above-described problem by adding a query turn indicator (invocation counter) to each input name, and then accepting only those response values whose tag and turn indicator match the expected input. For example, when query A is made for the first time, the system registers an open slot for input values matching query A-1. User inputs are all tagged in the same fashion so that all inputs in response to query A-1 would be tagged as A-1-n (n being the path identifier). FIG. 3 illustrates how "Accept Tagged Input with Turn Indicator" accepts only the proper input. As seen in FIG. 3, this method allows the system to properly identify the response values, and discard the false ones.

The present invention is a gateway for simultaneous multi-path, multi-modal, and multi-user access to data and applications via non-voice and voice devices. It takes into account the issue of processing inputs collected from multiple users or multiple devices when they are all interacting with the same single application in the same single session. It also resolves the issue of simultaneous inputs made in response to consecutive queries in different states.

The method of simultaneous, multi-path inputs of the present invention enables inputs to be made via any voice interface or data interface devices (e.g. phone, Keyboard, PDA, etc.) used during the same session. The inputs are fed to the session object, and given unique identifiers, or unique "tickets" for each input. An invocation counter in turn tracks when the inputs are made. The inputs and their associated identifiers are stored in the memory of the session object.

Each time an input is received in response to a query, the gateway checks to see whether the input ticket matches that of the most recent query. If so, the input is accepted, otherwise, the input is discarded.

BRIEF DESCRIPTION OF DRAWINGS

The various aspects, advantages and novel features of the present invention will be more readily comprehended from the following detailed description when read in conjunction with the appended drawings, in which.

DETAILED DESCRIPTION OF PREFERRED EMBODIMENTS

Figure 1:
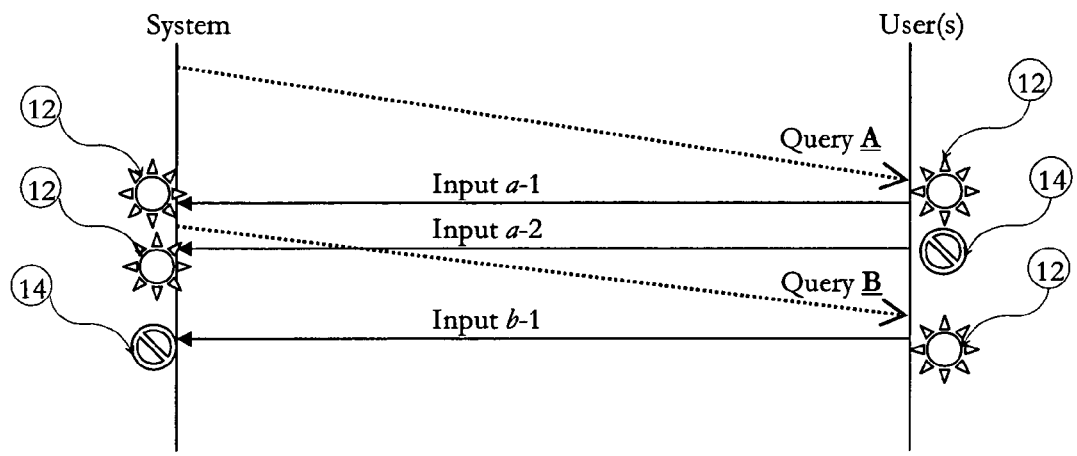
FIG. 1 illustrates when a conventional "Accept First Input" fails in the case of two consecutive queries and two nearly simultaneous responses to the first query, and how the second input (made in response to the first query) may be accepted by mistake as a valid response to the second query.
Figure 2:
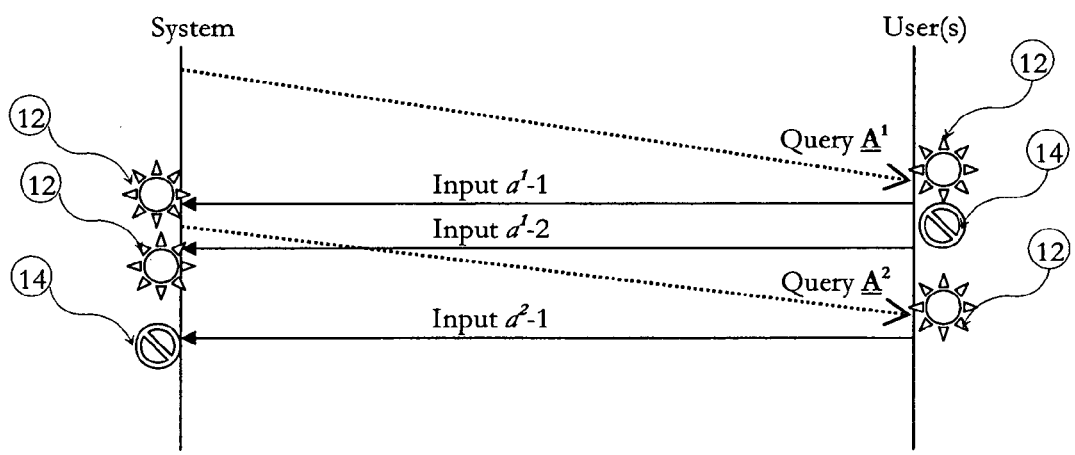
FIG. 2 illustrates when a conventional "Accept Tagged Input" fails when the same dialog is repeated, and that, if the input data is tagged to the dialog alone, a problem occurs if the same dialog is repeated twice, and the second input (made in response to the first query) is accepted by mistake as a valid response to the second query.
Figure 3:
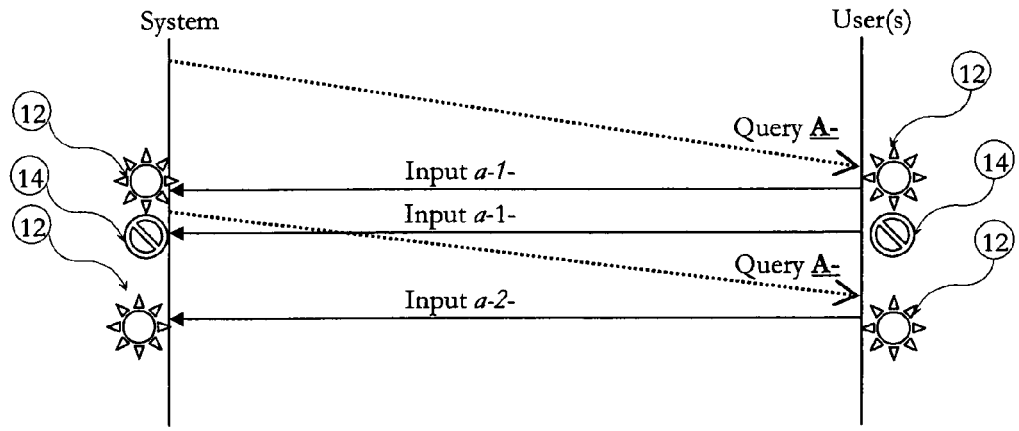
FIG. 3 illustrates when "Accept Tagged Input with Turn Indicator" accepts only the proper input in accordance with an embodiment of the present invention.
Figure 4:
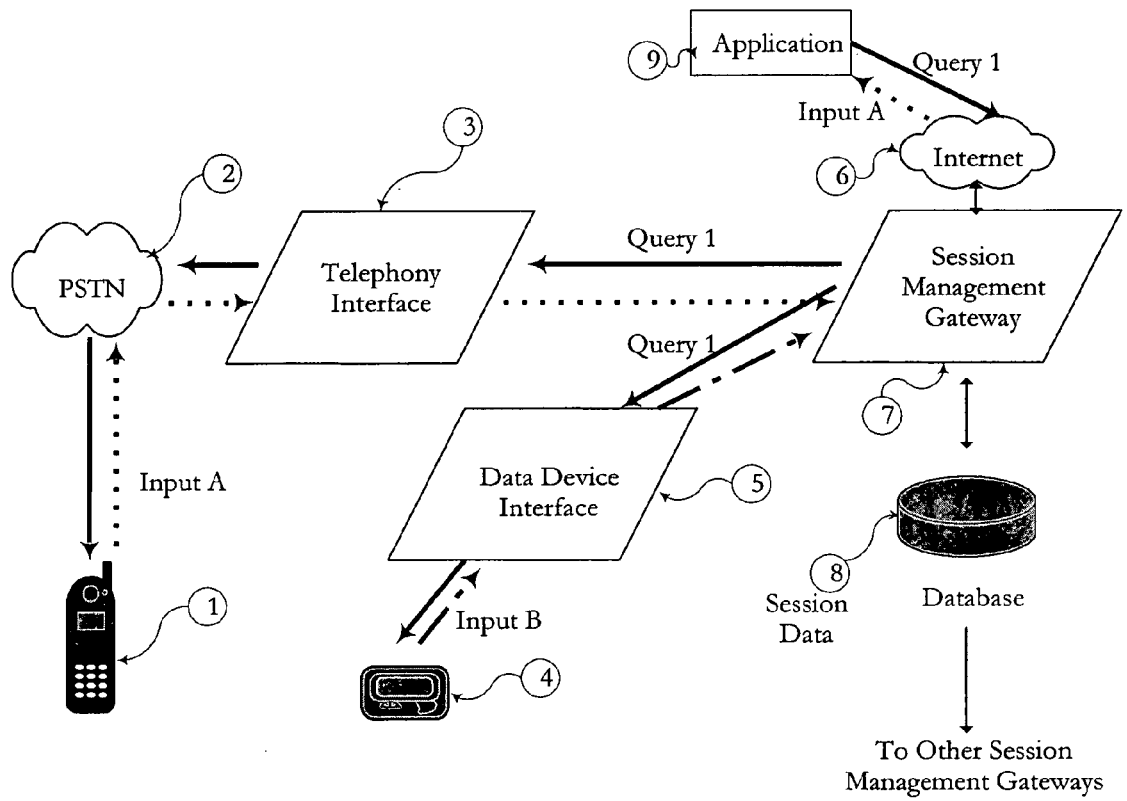
FIG. 4 illustrates how Inputs A and B are made simultaneously, and how Input B attempts to occupy the same location as Input A but is discarded in accordance with an embodiment of the present invention.

With reference to FIG. 4, a software method is provided in accordance with the present invention to allow one or more users to interact with data and applications in using multiple modes of interaction (voice, data, etc.) simultaneously. The solution comprises four main components, that is,

- a Session Management Gateway (7) capable of interacting with an application (9) via the Internet (6) from the one side (i.e., using standard Internet protocols for connection to Internet-based applications) and multiple client interfaces such as a Telephone Interface (3) or a Data Device interface (5) from the other side, and also capable of maintaining the transaction session with the Application (9) separate from interaction sessions with client devices, and capable of maintaining the interaction session with the application (9) in a database (8) even if no client device is connected at that moment to the session pertaining to the said transaction.
- a Data Device Interface (5) capable of interacting with data devices (4) equipped with display, keyboard, sound interface, location sensor, and so on. Data device (4) may have any combination of one or more human or machine data sources which can relay user input (e.g., a keyboard) or produce data automatically (e.g., a location sensor), as well as modules which can present data (e.g., a display that shows the data to a human, or a relay that uses the data to control an engine).
- a Telephony Interface (3) that allows callers to access their sessions using any type of voice interface devices (e.g. a mobile phone (1)), via a network such as a public switched telephone network (PSTN) (2) and is capable of presenting the data to the user in audible fashion, and also capable of collecting input from the user in spoken fashion (spoken commands) as well as other forms such as DTMF input.
- A Database (8) which maintains transaction sessions controlled by Session Management Gateway (7).

With reference to FIG. 4, a software system for voice and non-voice access to data and application for simultaneous multi-path user access is shown that uses a ticketing mechanism to track the order of the inputs in accordance with the present invention. Voice devices can include telephone-based devices as well as microphone access to an Internet system. Non-voice devices can include keyboard, Personal Digital Assistant (PDA). As shown in FIG. 4, Inputs A and B are made simultaneously. Input B tries to occupy the same location as Input A, but is discarded.

A simultaneous input session involves concurrent inputs from multiple devices. In FIG. 4, the application in the backend (9) issues Query 1 to the Session Management Gateway (7). Query 1 is formatted for each client, and is assigned a unique identifier and an invocation counter identifying how many times the same exact query in this dialog has been visited in this session. The resulting query is then sent to all client interfaces currently logged to the transaction session pertaining to this interaction. In response to Query 1, user makes an utterance in the mobile phone (1), which is taken as Input A. Each client interface will attach the proper identifier and invocation counter to the input phrases arriving from the client interface, and sends that to Session Management Gateway (7).

It is obvious to those trained in the art that the same string could contain the unique identifier and the invocation counter.

For example, the user is using the system to order food. The user has both voice and keyboard access. When asked what kind of cuisine is desired, the user types, "Chinese" (Input A). Because the user is anxious, she simultaneously says into the microphone "Chinese" (Input B) during a system delay. The system then prompts, "You want to order Chinese food?" The user changes her mind and says, "No." When the system returns to the menu, the voice input, "Chinese," arrives (delayed) but is denied because it was made during an earlier invocation.

Although the present invention has been described with reference to a preferred embodiment thereof, it will be understood that the invention is not limited to the details thereof. Various modifications and substitutions have been suggested in the foregoing description, and others will occur to those of ordinary skill in the art. All such substitutions are intended to be embraced within the scope of the invention as defined in the appended claims.

A method and system for providing a simultaneous, multi-path, multi-modal, and multi-user interface to users is discussed, where multiple inputs during the same user session arriving from different devices are handled properly. Each input is assigned a unique identifier, clocked with a counter and associated with an address. Other inputs that attempt to arrive at the same location are discarded.

What is claimed is:

1. A system that allows multiple devices to access the same transaction session at the same time, the system comprising:

a session management gateway connected to an application with which the transaction session is established and to the multiple devices; and a memory device;

wherein the session management gateway is programmable to process a query from the application for transmission to the multiple devices and to process simultaneous inputs from the multiple devices in response to the query during the transaction session by assigning a unique identifier to the query and providing a query turn indicator, the unique identifier and the query turn indicator being stored in the memory device, transmitted with the query to the multiple devices logged to the transaction session and attached by the multiple devices receiving the query to the inputs generated via the multiple devices, the session management gateway being operable to compare the unique identifier and the query turn indicator received with the inputs with the unique identifier and the query turn indicator corresponding to the query and stored in the memory device to process the inputs received from all of the multiple devices in response to the query properly by accepting the corresponding one of the inputs when a match is determined, and discarding the inputs responding to the query that are identified as subsequently received via their respective query turn indicators.

2. A system as claimed in claim 1, wherein the session management gateway is configured to allow multiple users to access the same transaction session and concurrently interact with that transaction session via different multiple devices.

3. A system as claimed in claim 1, wherein the session management gateway is configured to allow for inputs from devices selected from the group consisting of a computer keyboard, a microphone, a phone, other data input device, and other voice input device at the same time while responding with the appropriate outputs.

4. A system as claimed in claim 1, wherein different types of inputs can be received concurrently and processed during the transaction session, the different types of inputs being spoken inputs and keypad inputs.

5. A system as claimed in claim 1, wherein the session management gateway is programmable to format the query for use by different types of the multiple devices requiring different formats.

6. A system as claimed in claim 1, wherein the session management gateway is programmable to indicate the unique identifier as invalid in the memory device to prevent incorrect inputs from being accepted by the session management gateway as valid when query is repeated.

7. A system as claimed in claim 1, wherein the session management gateway comprises a counter and operates the counter as an invocation counter for the query turn indicator to track when the inputs are made.

8. A system as claimed in claim 1, wherein the query turn indicator identifies how many times the session management gateway has sent queries to the multiple devices.

9. A system as claimed in claim 1, further comprising a database connected to the session management gateway for storing data relating to the transaction session.

10. A system as claimed in claim 9, wherein the session management gateway is programmable to maintain data relating to said transaction session with the application in the database separate from interaction sessions with the multiple devices and interaction sessions with the application.

11. A system as claimed in claim 10, wherein the interaction session with the application is maintained in the database even if none of the multiple devices are connected to the transaction session.

12. A method for managing concurrent inputs from multiple devices in response to a query, the multiple devices interacting with the same application in the same transaction session, the method comprising the steps of:

assigning a unique identifier to the query;

providing a query turn indicator;

storing the unique identifier and the query turn indicator in a memory device;

transmitting the unique identifier and the query turn indicator with the query to the multiple devices logged to the transaction session;

attaching the unique identifier and the query turn indicator to the inputs generated via the multiple devices, receiving transmitted ones of the inputs;

comparing the unique identifier and the query turn indicator received with the inputs with the unique identifier and the query turn indicator corresponding to the query and stored in the memory device;

accepting the corresponding one of the inputs when a match is determined, and discarding the inputs responding to the query that are identified as subsequently received via their respective query turn indicators.

13. A method as claimed in claim 12, wherein the inputs can be different types of inputs selected from the group consisting of spoken inputs and keypad inputs.

14. A method as claimed in claim 12, further comprising the step of format the query for use by different types of the multiple devices requiring different formats.

15. A method as claimed in claim 12, further comprising the step of indicating the unique identifier as invalid in the memory device to prevent incorrect inputs from being accepted as valid when query is repeated.

16. A method as claimed in claim 12, wherein providing step comprises operating a counter provided to each of the inputs as an invocation counter for the query turn indicator to track when the inputs are made.

17. A method as claimed in claim 12, wherein the query turn indicator identifies how many times the session management gateway has sent queries to the multiple devices.

18. A method as claimed in claim 12, further comprising the step of storing data relating to the transaction session.

19. A method as claimed in claim 18, wherein the storing step for storing data relating to the transaction session comprises the step of maintaining data relating to said transaction session with the application separate from interaction sessions with the multiple devices and interaction sessions with the application.

20. A method as claimed in claim 19, wherein data relating to the interaction session with the application is stored even if none of the multiple devices are connected to the transaction session.

* * * * *